Figure 2:
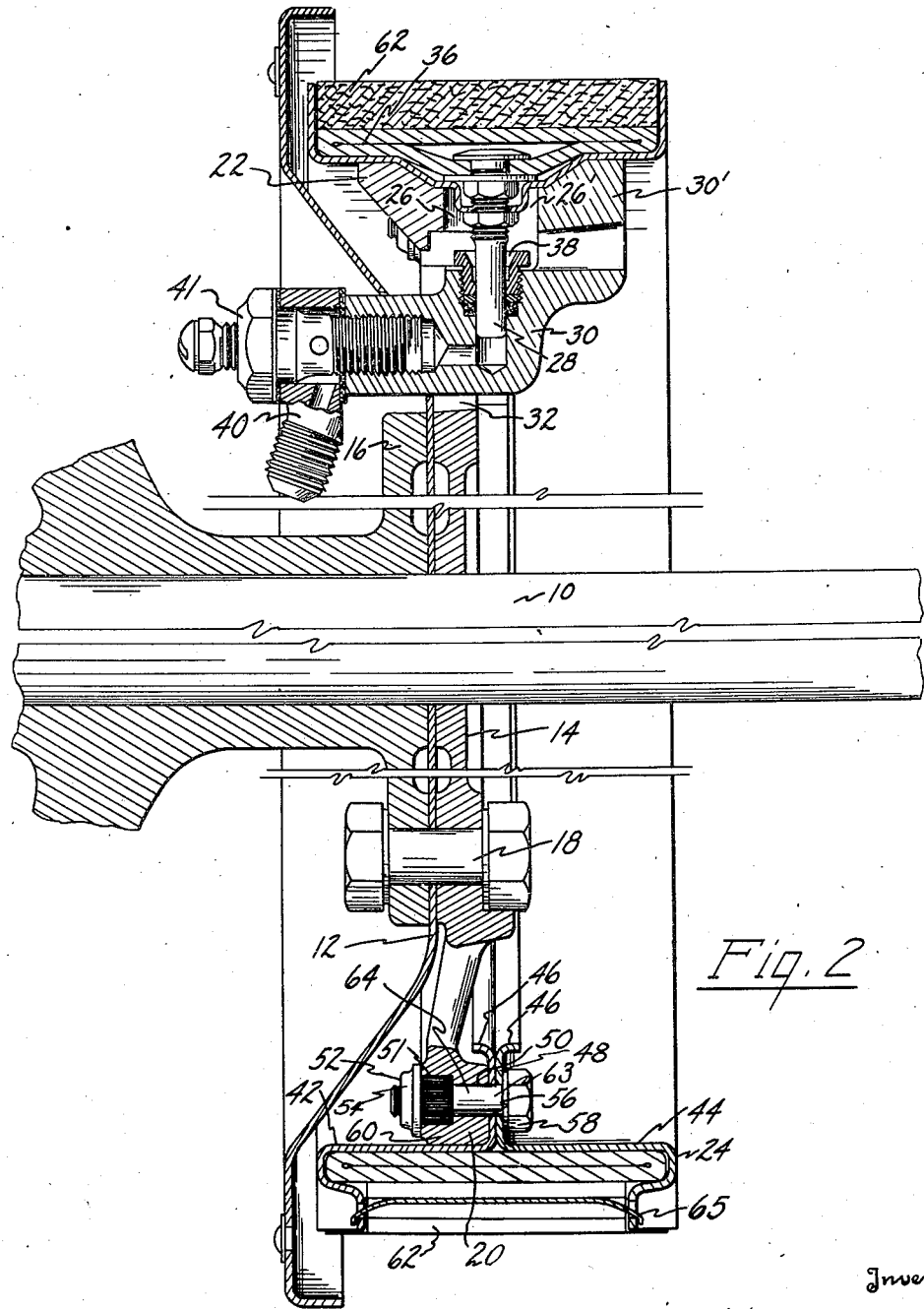

March 24, 1942. C. HOLLERITH 2,277,434
AIRPLANE BRAKE CONSTRUCTION AND THE LIKE
Filed Feb. 14, 1940 2 Sheets-Sheet 1
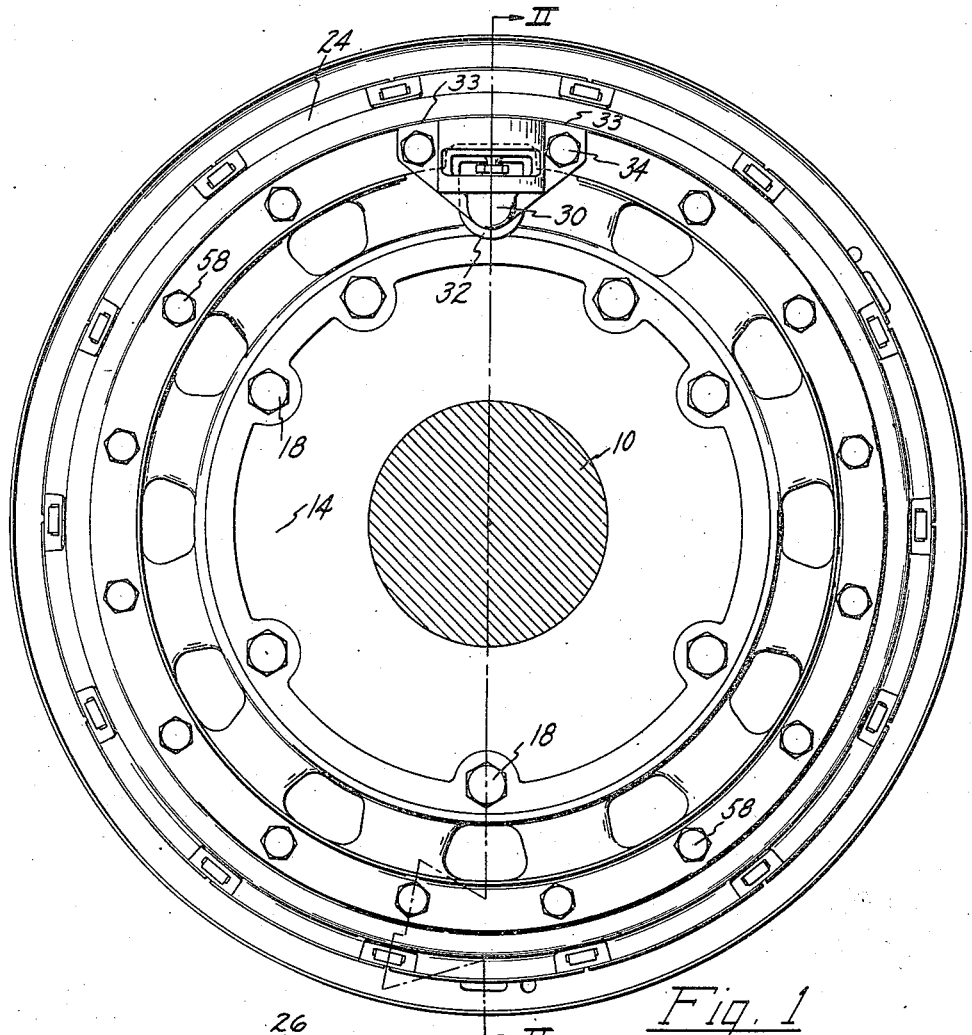
Fig. 1
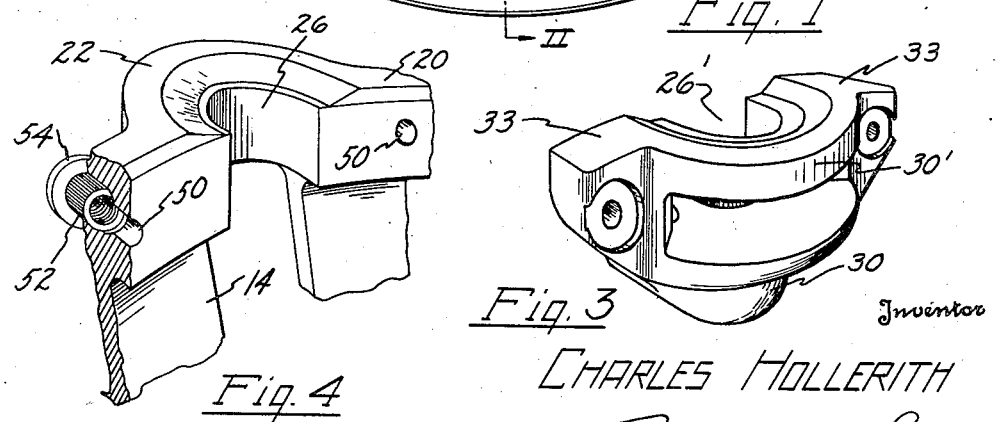
Fig. 3
Fig. 4
Inventor
CHARLES HOLLERITH
By Bearman & Langford
Attorney March 24, 1942. C. HOLLERITH 2,277,434
AIRPLANE BRAKE CONSTRUCTION AND THE LIKE
Filed Feb. 14, 1940 2 Sheets-Sheet 2

Inventor
CHARLES HOLLERITH
By Beaman & Langford
Attorney

Patented Mar. 24, 1942

2,277,434

UNITED STATES PATENT OFFICE 2,277,434

AIRPLANE BRAKE CONSTRUCTION AND THE LIKE

Charles Hollerith, Jackson, Mich., assignor to Hayes Industries, Inc., Jackson, Mich., a corporation of Michigan Application February 14, 1940, Serial No. 318,817

7 Claims. (Cl. 188—152)

The invention relates to improvements in expander tube brake assemblies. While the principles herein disclosed are not confined to any particular field, brake assemblies embodying the present invention are especially well adapted to aircraft landing wheels.

One of the objects of the invention is to provide an expander tube assembly which is so mounted upon the torque spider or its equivalent as to enable the tube assembly to be readily mounted and demounted as a unit without removal of the brake spider from its mounting frame on the landing gear.

Another object is to provide an improved expander tube assembly which may be mounted and removed as an assembled unit from the brake torque spider.

A further object is to provide an expander tube assembly which is removable as an assembled unit and has improved reinforcements in the region of the tube stem.

A still further object resides in providing an improved manner of removably supporting the rim of an expander tube assembly from the torque spider or its equivalent.

These and other objects and advantages relating to construction, arrangement and combination of parts will hereinafter appear.

In the drawings,

Fig. 1 is a side elevational view of the torque spider with brake and fairing attached and the wheel removed, Fig. 2 is a sectional view taken on line II—II of Fig. 1, Fig. 3 is a perspective view of the inlet connection, and Fig. 4 is a fragmentary plan view of a portion of the torque spider.

To simplify the disclosure, the wheel with brake drum attached is shown removed from the axle 10 of the landing gear. The fairing 12 and torque spider 14 are shown secured to the torque flange 16 by bolts 18. In the illustrated form the spider 14 is cast from a light alloy with a rim portion 20 of the cross-section shown in the lower portion of Fig. 2 throughout its entire circumference except for the offset reinforcing boss 22 which gives added support to one side of the channel rim 24, adjacent the recess 26 in which the tube stem 28 is located. The other side of the rim 24 adjacent the recess 26 is reinforced by the inlet connection 30 which extends through an opening 32 in the spider 14. The portion 30' of the inlet connection 30 has a complementary recess 26' and ears 33 through which bolts 34 pass to secure the connection 30 to the rim 20 of the spider 14. The stem 28 of the expander tube 36 is held in fluid sealed relation with the connection 30 by the packing nut 38 in a well known manner.

The channel rim 24 in which the expander tube 36 is located is shown fabricated from two sheet metal parts 42 and 44 each having a radial flange 46 which collectively form the flange 48. Circumferentially spaced about the rim 20 are bolt holes 50 each having an enlarged portion 51 into which the knurled portions 52 of the nuts 54 are press fitted and held against rotation. Similarly located holes 56 in the flange 48 are provided to enable the rim 24 to be mounted and demounted solely by manipulation of the bolts 58 which are readily accessible with the wheel removed from the axle 10. It will appear from Fig. 2 that the rim 24 is piloted at 60 on the rim 20 and that all the torque is taken on the unthreaded portion of the bolts 58 as at 63 and 64.

The brake assembly within the rim 24 as shown comprises brake blocks 62 held in position by retractor springs 65 extending between the rim sides. In the event of needed repair or replacement of any part or all of the brake assembly, this may be readily accomplished as follows: The wheel is first removed from the axle 10; next the braking fluid line (not shown) is disconnected from the nipple 40 and the nipple assembly 41 unscrewed from the inlet connector 38 and the bolts 34 and 58 removed. The brake structure entirely assembled including the connection 30 can now be removed from the spider 14, as a unit for inspection, repair or replacement of a similar assembly.

Those skilled in the art will appreciate that by the foregoing construction I have provided a brake structure assembly and means of support which (1) permits attachment and removal of the brake tube and brake block and supporting structure as a unit without disassembling any part; (2) permits use of light metal rim for the expander tube and brake blocks with adequate reinforcement adjacent tube stem, and (3) provides for suitable support for the expander tube rim and transfer of torque from rim to torque spider.

Having described my invention, what I desire to secure by Letters Patent and claim is:

1. In a fluid brake assembly, the combination with a torque member having an opening therein adjacent its outer periphery, of a brake structure comprising a rim part, removable means for securing said part to one side of said member and accessible for removal from the same side, a fluid inlet connection having an attachment portion located upon said side of said member and fixed thereto by removable means, and a portion of said inlet connection extending through said opening for removable connection to the brake fluid pressure line.

2. In a fluid brake assembly, the combination with a circular torque member having an opening and an off-set peripheral portion adjacent said opening, of a brake structure comprising a rim part piloted upon the periphery of said member and having a radial flange disposed along one side of said member, an expander tube in said rim part, a fluid connection with said tube extending through said rim and having a lateral portion extending through said opening and being of lesser dimension so as to be capable of lateral, bodily removal therefrom, said connection except for said lateral portion being entirely disposed in one side of said off-set portion, a reinforcement portion of said connection being attachable to said side of said member opposite said off-set to form a complementary portion for the support of said rim, and removable means for connecting said rim part and said reinforcement portion to said side of said member.

3. In a fluid brake assembly, the combination with a circular torque plate, of a brake element supported from said plate comprising a circular channel shaped rim having the web of the rim piloted upon the periphery of said plate and having an attachment portion disposed to one side of said plate, removable means connecting said portion to said side of said plate, and a fluid connection depending inwardly from said rim and having clearance with said plate for lateral removal of said connection and rim from said plate as a unit.

4. In a fluid brake assembly, the combination with a circular torque plate, of a brake element supported from said plate comprising a circular channel shaped rim having an attachment portion disposed to one side of said plate, means for removably connecting said portion to said side of said plate, a fluid connection associated with said brake element, and a slot in the periphery of said torque plate through which said connection may pass upon lateral movement whereby said connection and brake element having clearance with said plate for mounting and demounting by lateral movement as a unit.

5. In combination, a torque member having a circular rim portion, an expander tube brake structure comprising a channel shaped rim with an expander tube and brake element disposed within the channel thereof, a fluid tube connection extending through the web of said channel rim, an attachment flange extending radially inward from the web of said channel rim and disposed along one side of said torque member, the web of said channel rim adjacent said flange being piloted upon the periphery of said torque member, removable means for securing said flange to the side of said torque member, said flange and tube connection being all disposed upon the same side of said torque member so as to have clearance for the mounting and demounting by lateral movement of said rim and connection upon said torque member as an assembled unit.

6. In a fluid brake assembly, the combination with a torque member, of a channel shaped rim supported from said member carrying the brake element and radial actuating means therefor, a fluid conduit extending through the web of said rim part, a portion of said torque member giving support to the web of said rim at one side of said conduit, and an inlet connection part coupled with said conduit and giving support to said web at the opposite side of said conduit, and means for connecting said part to said torque member.

7. In a fluid pressure operated brake assembly, the combination of a torque member in the form of a circular plate having a rim portion with an off-set and a lateral opening adjacent said offset, of a brake structure comprising a channel shaped circular member piloted upon said rim portion, an expander tube in said rim and having a conduit portion projecting into a recess defined by said off-set, an inlet connection extending through said opening and coupled to said conduit with an off-set portion thereof opposite said first off-set, said off-set portions reinforcing said channel adjacent said conduit, and means for securing said channel and inlet connection to one side of said torque member.

CHARLES HOLLERITH.